March 5, 1963  J. F. NEWCOMB  3,080,490
ADJUSTABLY POSITIONED CONTROL MEANS FOR POWER
PRESSES AND OTHER MACHINE TOOLS
Filed Dec. 23, 1954  2 Sheets-Sheet 1
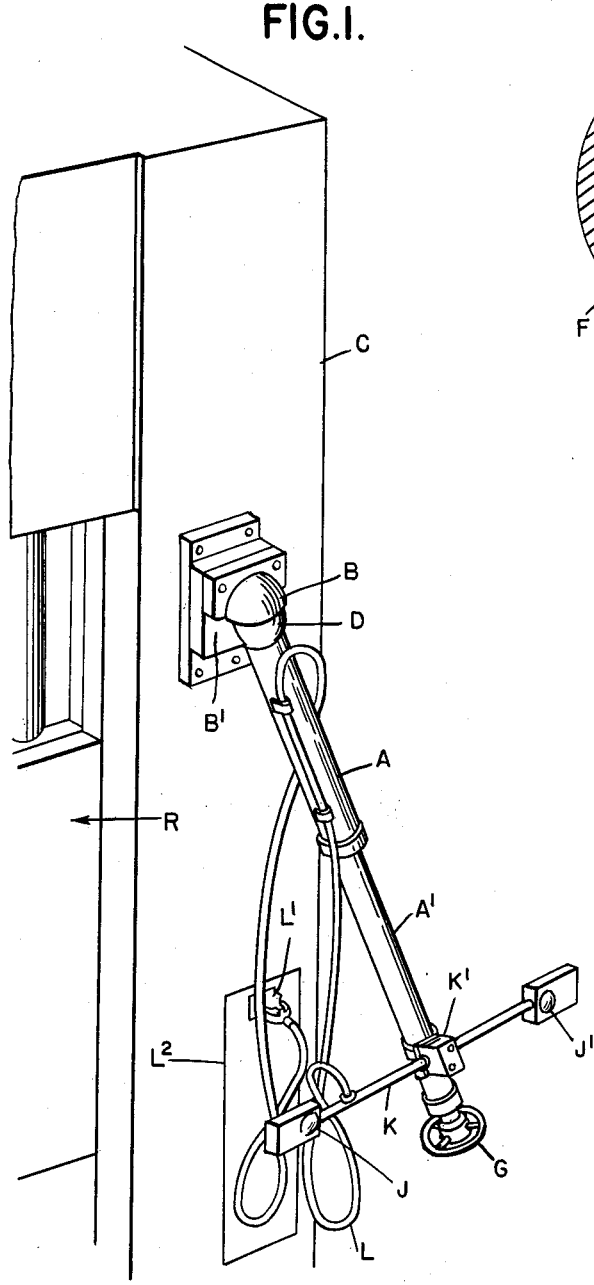
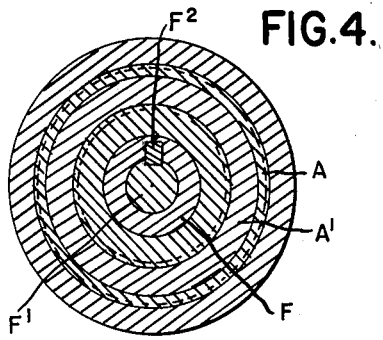
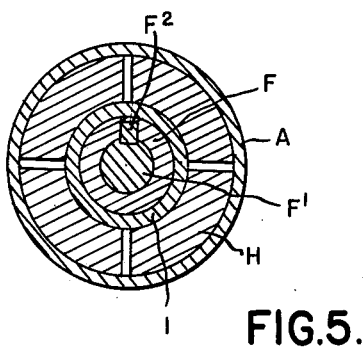
INVENTOR.
JOHN F. NEWCOMB
BY
ATTORNEYS March 5, 1963

J. F. NEWCOMB 3,080,490

ADJUSTABLY POSITIONED CONTROL MEANS FOR POWER
PRESSES AND OTHER MACHINE TOOLS

Filed Dec. 23, 1954

*INVENTOR.*
JOHN F. NEWCOMB
BY
*Whittemore Hulbert & Belknap*

ATTORNEYS

United States Patent Office 3,080,490
Patented Mar. 5, 1963

3,080,490
ADJUSTABLY POSITIONED CONTROL MEANS FOR POWER PRESSES AND OTHER MACHINE TOOLS
John F. Newcomb, 10105 Borgman, Huntington Woods, Mich.
Filed Dec. 23, 1954, Ser. No. 477,342
6 Claims. (Cl. 307—112)

In the present state of the art power presses and other machine tools are frequently electrically controlled and the control switch or circuit closer is located in relation to the machine at the point most convenient for the operator. However, the point most convenient for the operator may vary according to the character of work that is being performed or the arrangement of the press in relation to other machines.

It is, therefore, the object of the invention to provide a control means which while normally fixed in its relation to the machine to be controlled is nevertheless adjustable to other locations while retaining its attachment to the said machine.

To this end the invention consists in the construction as hereinafter set forth.

In the accompanying drawings:

FIG. 1 is a perspective view showing a portion of the frame of a power press together with the adjustable control means attached thereto.

Figure 3:
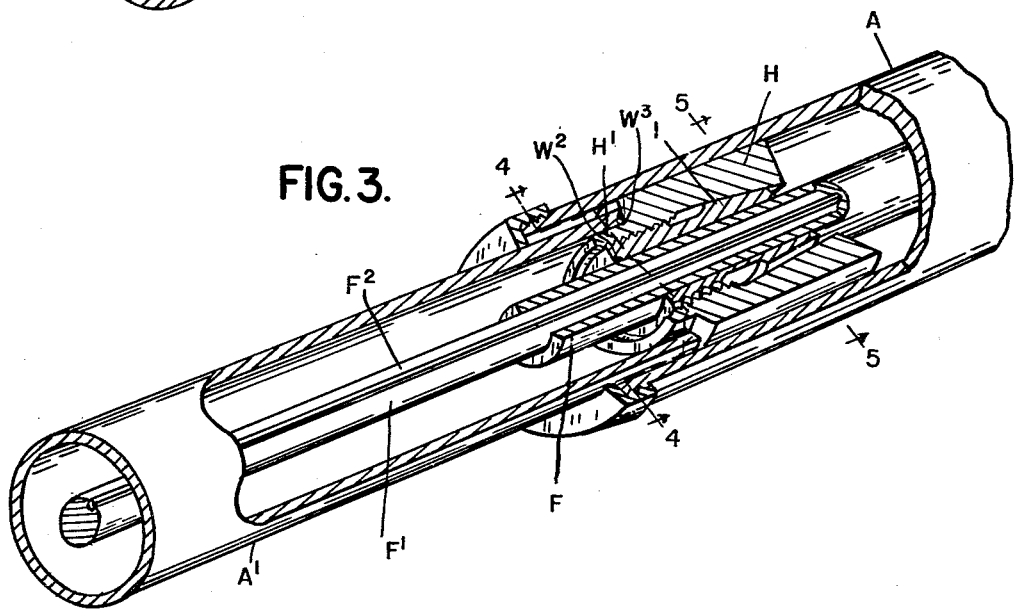
FIG. 3 is a sectional perspective view illustrating the telescopic extension of the tubular rod for carrying the control switch together with the means for clamping said extension in its position of adjustment.

FIGS. 4 and 5 are cross sections, respectively on lines 4—4 and 5—5, FIG. 3.

Figure 2:
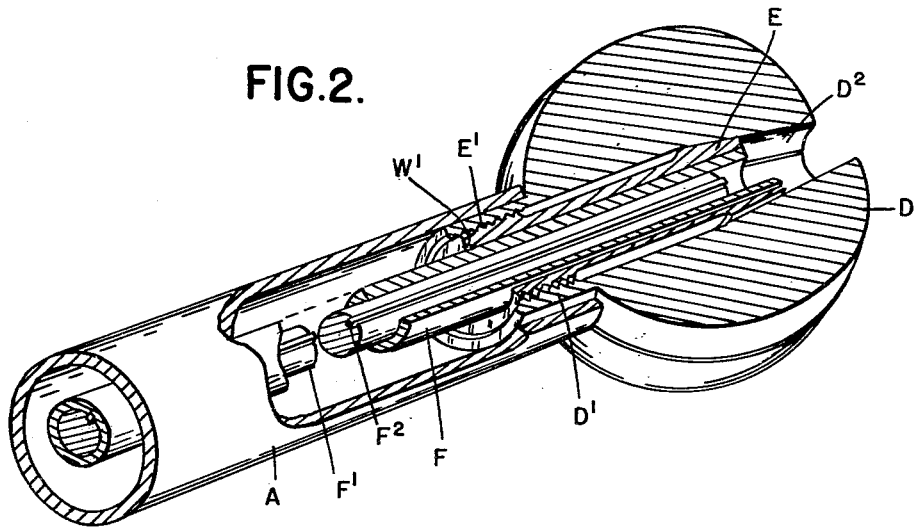
FIG. 2 is a sectional perspective view of a portion of the control means showing the ball member of a universal joint and the clamping means for holding the same rigid in its socket.

An important feature of my improved control means is that it is normally held in fixed relation to the machine so that the operator will know exactly where to find it. However, this position may be changed whenever such change is desirable. Generally described the control means comprises a rod, preferably tubular, which is attached at one end to the frame of the machine by a universal joint permitting of adjusting it to extend at various angles. The rod is also preferably extensible as by the use of telescopically engaged tubes and the control switch is mounted at the free end of the rod or its extension. There is also clamping means operable from the free end of the rod for holding the same rigid in any position of adjustment thereof. As shown in FIG. 1, A is the section of the rod which is attached to the frame of the machine and A' the extension thereof, being formed of telescopically engaged tubing. B is a spherical socket member mounted at a convenient point on the machine frame C. D is a ball member formed in sections, all of which are secured by a tubular neck portion D' to the end of the rod portion A but are capable of a slight relative movement. Within these ball sections is a conical recess D² which is engaged by a conical wedge mmeber E. The latter is tubular and has a threaded portion E' for engaging corresponding inner threads in the neck portion D' so that by rotating the member E in one direction it will expand the ball into clamping engagement with its socket. The socket B is cut away at B' so as to permit a considerable degree of angular adjustment of the rod and its extension when the ball is unclamped. The clamping means includes a tubular shaft F within and attached to the tubular wedge member E and extending outward therefrom through the member A. An inner shaft F' is telescopically engaged with the shaft F and rotatively coupled therewith by a spline engagement F². The shaft F' extends to the outer end of the extension member A' in which it is journalled and a hand wheel G is secured to said shaft to rotate the same, thereby clamping or unclamping the ball in its socket. For holding the tubular extension member A' in different positions of extension the inner end of said tube has attached thereto a plurality of segmental cylindrical jaws H engaging the inner surface of the tubular member A. These jaws are attached to the member A' by a neck portion H' which also is internally threaded for engagement with a conical tubular wedge member I which surrounds the tube F and is attached thereto. This wedge engages a conical recess within the jaws H and is adapted to expand the same when rotated by the hand wheel G. As shown in FIGURES 2 and 3, the wedge member E is attached to tubular shaft F by weld W¹. The wedge member I is attached to the tubular shaft F by weld W². The wedge shaped cylindrical jaws H are attached to the tubular extension A' by weld W³. Thus, the outer end of the tubular rod may within limits be adjusted to any desired position, both in reference to the angle of the rod to its pivotal connection with the frame and also as to its extension of said rod. Also, it is clamped to be held rigid in this position by turning of the hand wheel G which simultaneously operates the wedges I and E to clamp the jaws H and ball sections D. As the press is electrically operated the switch or circuit closer therefor may be mounted at the outer end of the extension rod A'. As shown there are two push button circuit closers J and J' arranged in series in the control circuit and which are mounted on a tubular rod K spaced sufficiently from each other to require both hands of the operator to close the circuit and start the press. The rod K is pivotally mounted at K' on the rod A so that it may be turned at different angles. The conductors from these circuit closers extend through the tube K and through a flexible cable L attached thereto, which latter is secured to the tubular member A to extend to near the universal joint and then to a fitting L' on the frame C.

With the construction as above described it will be understood that any power press or machine tool may be equipped with the control means which is then adjusted to the particular position in relation to the machine most convenient for the operator to actuate the circuit closer J or J' as shown in FIGURE 1, the machine has a stationary frame C and movable machine tool operating parts including a vertically movable ram R. The machine is provided with a conventional electrically controlled starter indicated generally at L².

What I claim as my invention is:

1. A control device for machine tools which may be adjusted into various positions and held therein in rigid relation to the frame of the machine, comprising a rod having one end thereof universally pivotally connected to said frame, a manually operable control element at the free end of said rod, said control element being electrically connected to said machine tool for operating the same, and means also operable from said free end for clamping said pivotal connection to hold said rod in any position of angular adjustment thereof rigid with said frame, said rod having a longitudinally extensible portion which carries at its outer end said clamping means and said control element, and means also operable from said free end for holding said extensible portion rigid in any position of extension, and having a single operable means for simultaneously clamping said pivotal connection and extensible portion in rigid positions.

2. A control device for machine tools which may be adjusted into various positions and held therein in rigid relation to the frame of the machine comprising a tubular rod having a sectional ball member at its inner end, a spherical socket member mounted on said frame, a wedge within said ball member, a rotatable rod within said tubular rod extending to the outer end thereof, a manually operable control element at the free end of said rod and means also operable from said free end for rotating said rod to operate said wedge and clamp said ball in its socket to hold said rod in any position of angular adjustment thereof rigid with said frame.

3. The construction as in claim 2 having a tubular extension for said tubular rod, clamping means for said extension in different positions of adjustment actuated by said rotatable rod, and a telescopic extension for said rotatable rod to the outer end of said extension.

4. Control device for power presses comprising a rod having the control means mounted at one end thereof and at its opposite end universally pivotally connected to the frame of the press at an elevated point thereon from which it depends, so that said control means may be adjusted to various different positions about said frame, and means also operable from the free end of said rod for locking said pivot to hold said rod in any position of adjustment thereof rigid with said frame, said control means including two separate push button circuit closers requiring simultaneous actuation for controlling the operation of the press, said circuit closers being spaced sufficiently to require both hands to simultaneously actuate the same, and an electric conductor electrically connecting said circuit closers and said power press and mechanically secured to said rod adjacent said pivotal connection.

5. A control device for a machine tool having a stationary frame, movable machine tool operating parts, and an electrically controlled starter for said movable parts, said control device comprising an arm having one end thereof universally pivotally connected to said stationary frame, to be adjustable at its free end into various positions with respect to said machine tool, means also operable from said free end for clamping said pivotal connection to hold said arm in any position of angular adjustment thereof rigid with said frame and a manually operable electric switch carried by the free end of said arm and electrically connected to said electric starter for operating the same.

6. A control device for a machine tool having a stationary frame, movable machine tool operating parts, and an electrically controlled starter for said movable parts, said control device comprising an arm having one end thereof universally pivotally connected to said stationary frame, to be adjustable at its free end into various positions with respect to said machine tool, said arm having a longitudinally extensible portion at the free end thereof, means operable from the free end of said longitudinally extensible portion for clamping the same rigidly to said arm and also operable for clamping said pivotal connection to hold said arm in any position of angular adjustment thereof rigid with said frame, and a manually operable electric switch carried by the free end of said extension and electrically connected to said electric starter for operating the same.

References Cited in the file of this patent
UNITED STATES PATENTS

| | | |
|---|---|---|
| 439,411 | Luetke | Oct. 28, 1890 |
| 598,219 | Going | Feb. 1, 1898 |
| 717,895 | McClain | Jan. 5, 1903 |
| 791,020 | Forg | May 30, 1905 |
| 1,607,807 | Anderson | Nov. 23, 1926 |
| 1,796,139 | Ciomei | Mar. 10, 1931 |
| 2,605,988 | Rock | Aug. 5, 1952 |